US011050769B2

(12) United States Patent
Toth et al.

(10) Patent No.: US 11,050,769 B2
(45) Date of Patent: Jun. 29, 2021

(54) CONTROLLING DYNAMIC USER INTERFACE FUNCTIONALITY USING A MACHINE LEARNING CONTROL ENGINE

(71) Applicant: Bank of America Corporation, Charlotte, NC (US)

(72) Inventors: Michael Toth, Charlotte, NC (US); Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 472 days.

(21) Appl. No.: 15/888,531

(22) Filed: Feb. 5, 2018

(65) Prior Publication Data

US 2019/0245877 A1     Aug. 8, 2019

(51) Int. Cl.
| | | |
|---|---|---|
| *H04L 29/06* | (2006.01) | |
| *G06F 21/53* | (2013.01) | |
| *G06N 20/00* | (2019.01) | |
| *G06F 3/0484* | (2013.01) | |

(52) U.S. Cl.
CPC .......... *H04L 63/1425* (2013.01); *G06F 21/53* (2013.01); *G06N 20/00* (2019.01); *H04L 63/083* (2013.01); *H04L 63/0861* (2013.01); *H04L 63/1491* (2013.01); *G06F 3/04842* (2013.01); *G06F 2221/034* (2013.01)

(58) Field of Classification Search
CPC ............. H04L 63/1425; H04L 63/1491; H04L 63/0861; H04L 63/083; G06N 20/00; G06F 21/53; G06F 3/04842; G06F 2221/034; G06F 2221/2127; G06F 21/31
See application file for complete search history.

(56) References Cited

U.S. PATENT DOCUMENTS

| | | | | |
|---|---|---|---|---|
| 4,719,566 | A * | 1/1988 | Kelley | G06F 21/31 |
| | | | | 340/5.27 |
| 6,748,540 | B1 * | 6/2004 | Canestaro | G06F 21/552 |
| | | | | 709/224 |
| 7,042,852 | B2 | 5/2006 | Hrastar | |
| 7,117,532 | B1 * | 10/2006 | Lyle | G06F 21/6218 |
| | | | | 726/23 |
| 7,237,123 | B2 | 6/2007 | LeVine et al. | |
| 7,412,723 | B2 | 8/2008 | Blake et al. | |
| 7,827,605 | B2 * | 11/2010 | Lyle | H04L 63/1425 |
| | | | | 726/16 |

(Continued)

*Primary Examiner* — Samson B Lemma
*Assistant Examiner* — Abdullah Almamun
(74) *Attorney, Agent, or Firm* — Banner & Witcoff, Ltd.; Michael A. Springs

(57) ABSTRACT

Systems for detecting unauthorized user and controlling dynamic user interface functionality are provided. The system may receive a request to access functionality that may include login credentials of a user. The request may also include additional information associated with a computing device from which the request is received. The request and additional data may be analyzing using one or more machine learning datasets to determine whether a user requesting access is an authorized user or an unauthorized user. If the user is an authorized user, the user may be authenticated to the system an authentic user interface having enabled functionality may be generated. If the user is an unauthorized user, a decoy user interface having functionality disabled may be generated.

21 Claims, 11 Drawing Sheets

(56) References Cited

U.S. PATENT DOCUMENTS

| | | | | |
|---|---|---|---|---|
| 7,934,258 | B2* | 4/2011 | Wahl | G06F 21/55 |
| | | | | 713/184 |
| 9,009,829 | B2* | 4/2015 | Stolfo | G06F 21/554 |
| | | | | 726/23 |
| 9,270,670 | B1* | 2/2016 | Fitzgerald | H04L 63/083 |
| 9,959,398 | B1* | 5/2018 | Blair | G06F 21/45 |
| 10,397,273 | B1* | 8/2019 | Stickle | H04L 63/1491 |
| 10,574,698 | B1* | 2/2020 | Sharifi Mehr | H04L 63/1425 |
| 10,686,809 | B2* | 6/2020 | Boss | H04L 63/1416 |
| 2012/0226912 | A1* | 9/2012 | King | G06F 21/31 |
| | | | | 713/183 |
| 2017/0134423 | A1* | 5/2017 | Sysman | G06F 21/554 |
| 2017/0289191 | A1* | 10/2017 | Thioux | H04L 63/1441 |
| 2018/0018657 | A1* | 1/2018 | Sawant | G06Q 20/36 |

\* cited by examiner

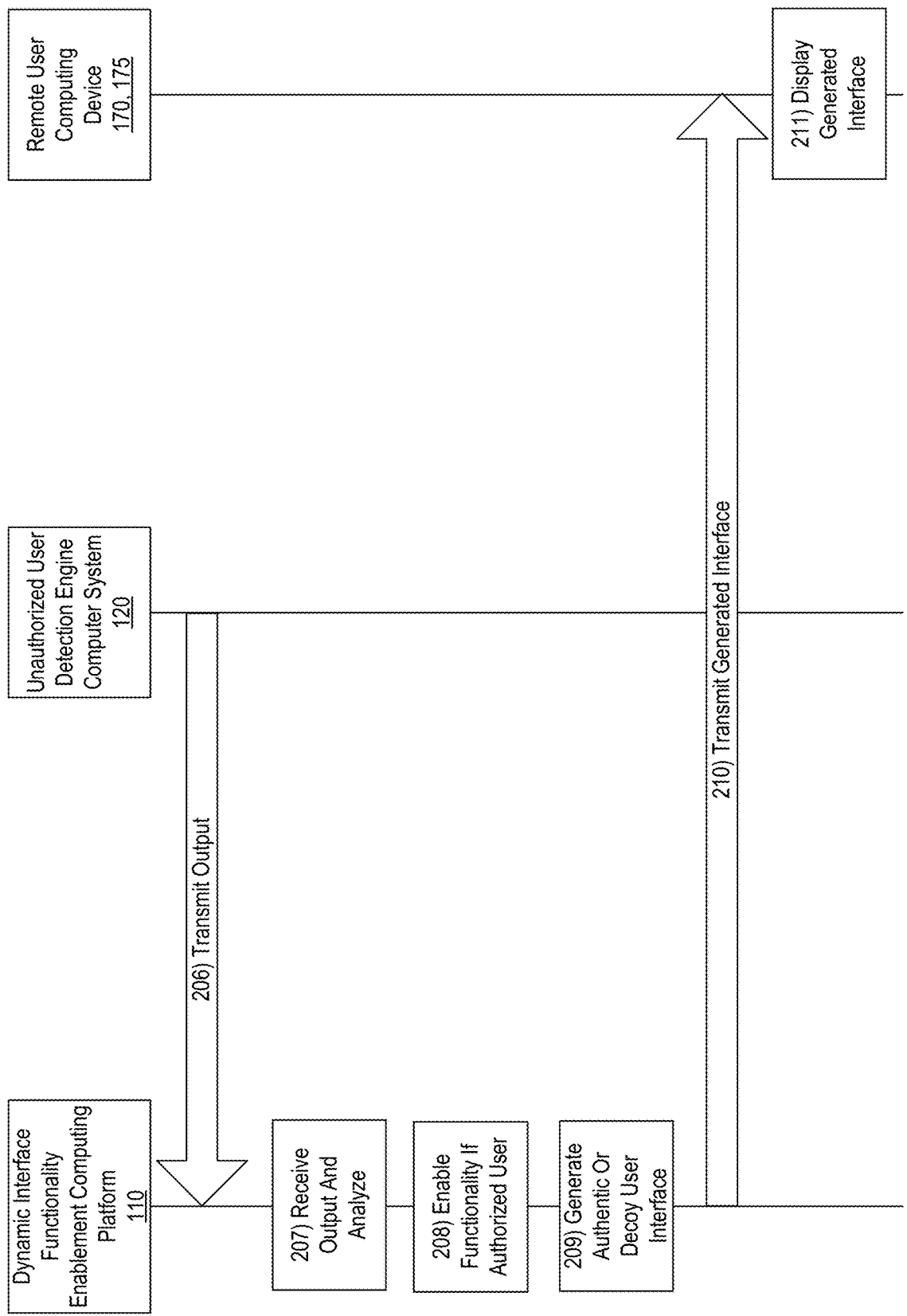

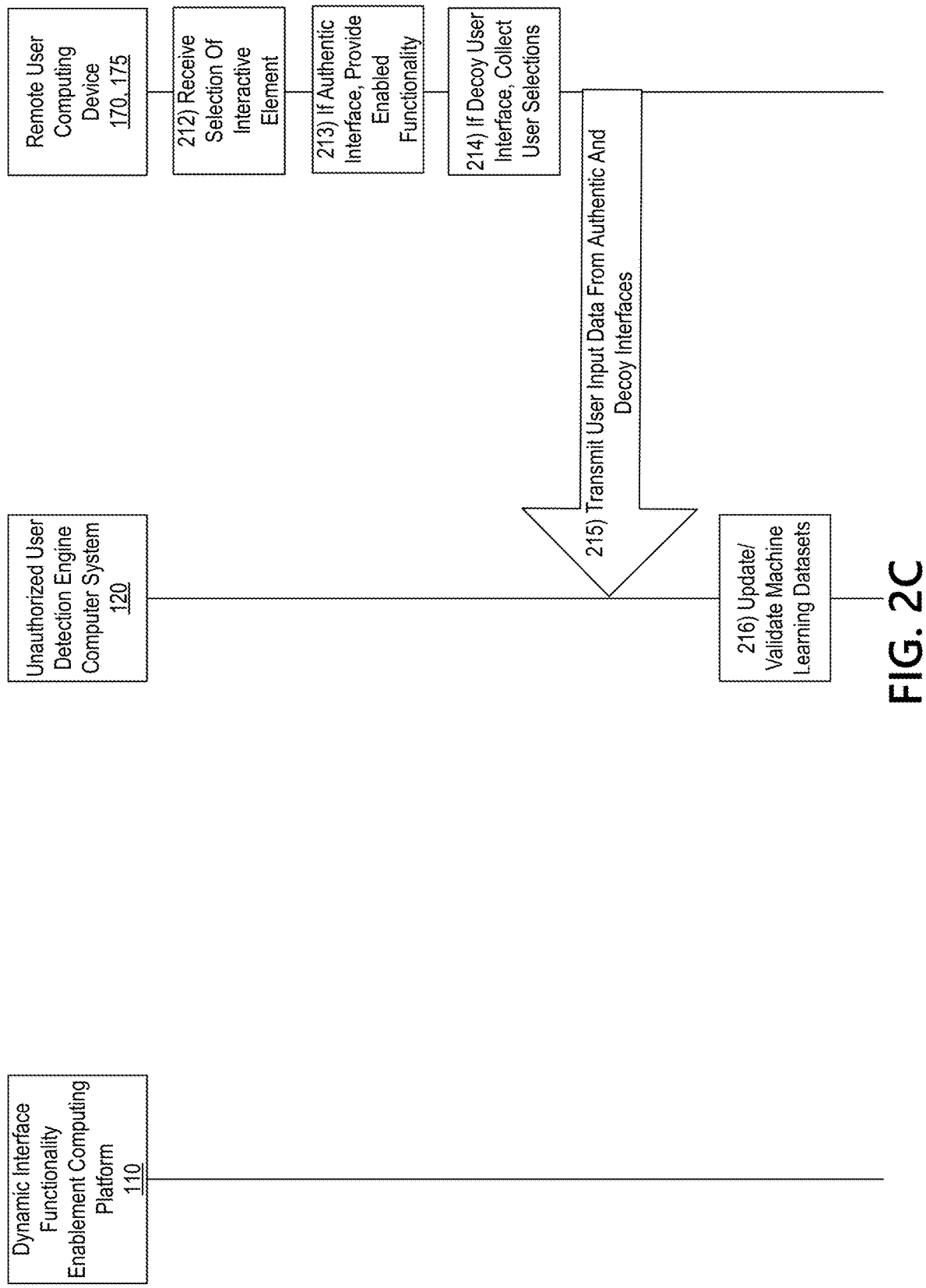

US 11,050,769 B2

1

CONTROLLING DYNAMIC USER INTERFACE FUNCTIONALITY USING A MACHINE LEARNING CONTROL ENGINE

BACKGROUND

Aspects of the disclosure relate to electrical computers and systems. In particular, one or more aspects of the disclosure relate to using machine learning to identify potential unauthorized users and control dynamic user interface functionality based on a determination of whether the user is authorized or unauthorized.

Identifying unauthorized users (e.g., users who attempt to access an application without authorization) is a challenge in the business world. Login credentials, such as a username and password, can be unlawfully obtained and used by unauthorized users to conduct unauthorized activity without the authorized user being aware of the activity until it's too late. It is common for unauthorized users to purchases batches of login credentials and run an automated script to attempt login with each set of credentials.

In conventional systems, if the credentials match pre-stored credentials, the user, even if he or she is unauthorized, is authenticated to the system. If the credentials do not match, a notification may be transmitted to the unauthorized user informing him or her that the credentials are not valid. Such conventional arrangements either provide access to the unauthorized user or inform the unauthorized user that the credentials are not valid, thereby losing the opportunity to obtain data related to the types of activity performed, and the like. Accordingly, it would be advantageous to provide a system in which a user is identified as unauthorized prior to authenticating the user and, if identified as unauthorized, dynamically modify functionality of a user interface provided to the unauthorized user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identifying unauthorized users attempting to access functionality associated with an application or user interface and dynamically modifying functionality associated with the application or user interface in order to thwart any potential unauthorized activity.

In some examples, a system, computing platform, or the like, may receive a request to access functionality. The request to access functionality may include login credentials of a user, such as username, password, personal identification number (PIN), biometric data, and the like. The request may also include additional information associated with a computing device from which the request is received, such as an internet protocol (IP) address, global positioning system (GPS) data associated with a location of the computing device, and the like. The request and additional data may be analyzing using one or more machine learning datasets to determine whether a user requesting access is an authorized user or an unauthorized user.

In some examples, if the user is an authorized user, the user may be authenticated to the system by comparing the received credentials to pre-stored credentials. If the user is authenticated, functionality associated with a user interface (and/or application) may be enabled and an authentic user interface may be generated. The authentic user interface may include a plurality of interactive elements having functionality associated with each interactive element enabled to provide the requested functionality to the authorized and authenticated user.

In some arrangements, if the user is an unauthorized user, functionality associated with a user interface (and/or application) may be disabled and/or decoy functionality may be enabled. A decoy user interface may then be generated. The decoy user interface may have a same or substantially similar appearance to the authentic interface but functionality associated with the plurality of interactive elements may be disabled (or may include alternate, decoy functionality). In some examples, selections made by the unauthorized user via the decoy user interface may be collected and analyzed to update and/or validate one or more machine learning datasets.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for implementing unauthorized user detection and dynamic interface control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using dynamic authentication to prevent unauthorized access to secure information systems and functionality associated therewith.

As mentioned above, preventing unauthorized users from accessing functionality is an important technical challenge. Conventional systems often rely on authenticating data such as login credentials when determining whether to provide access and/or functionality to a user. However, many unauthorized users are obtaining user credentials without the knowledge of an authorized user. Accordingly, in conventional systems that rely solely on user credentials to determine whether a user is authorized or unauthorized, even an unauthorized user with appropriate credentials can access functionality.

As discussed herein, various arrangements including using machine learning to determine whether a user is authorized or unauthorized (e.g., prior to authenticating the user). Accordingly, if an unauthorized user has authentic credentials, he or she may still be identified as unauthorized (e.g., based on internet protocol address, location, number of attempted logins, or the like). In some examples, unauthorized users may be presented with a decoy user interface (e.g., rather than a notification that credentials do not match, that a device is not recognized, or other indicator that the user is not in a recognized pattern). The decoy user interface may have functionality disabled, may have decoy functionality enabled, may provide decoy information (e.g., information other than accurate information presented in an authentic user interface), or the like.

In some arrangements, user selections made from the decoy interface may be collected and analyzed to update and/or validate one or more machine learning datasets, aid in more efficient and accurate identification of unauthorized users, anticipate unauthorized activity in order to mitigate or avoid damage to an authorized user, and the like.

These and various other arrangements will be discussed more fully below.

Figure 1A:
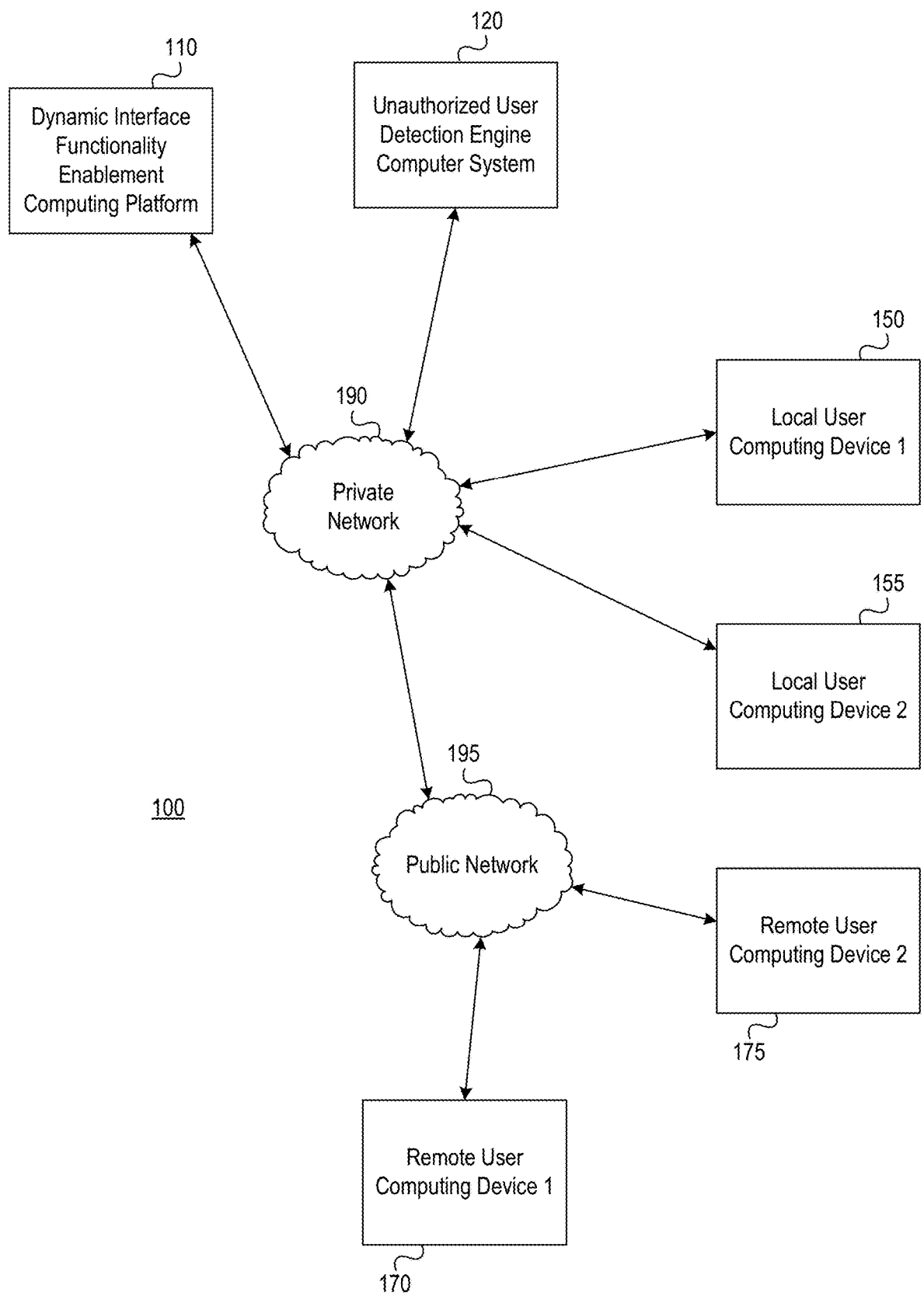
FIGS. 1A-1C depict an illustrative computing environment for implementing unauthorized user detection and dynamic interface control functions in accordance with one or more aspects described herein.
Figure 1B:
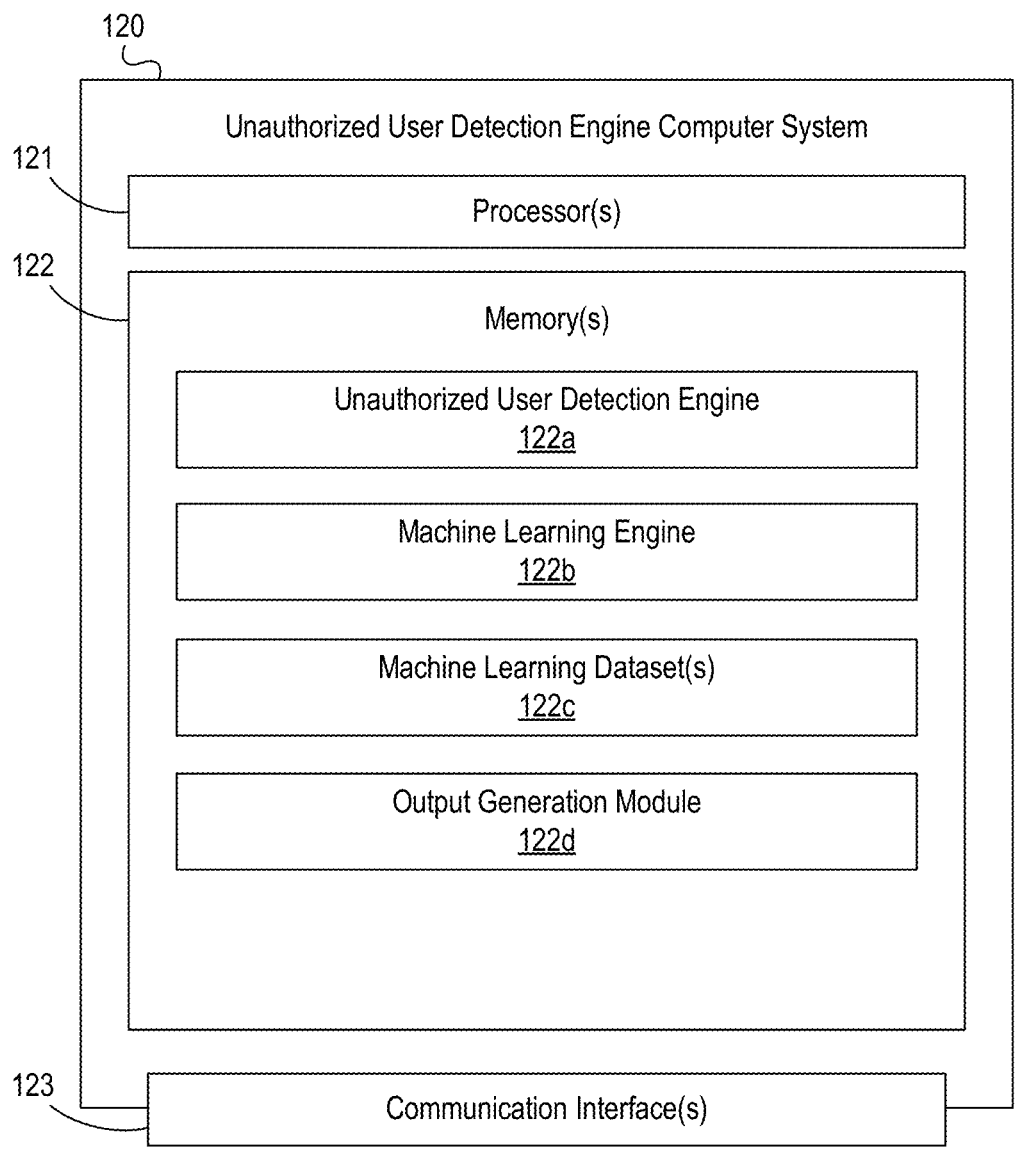

FIGS. 1A and 1B depict an illustrative computing environment for implementing and using a system for dynamically enabling user interface functionality in accordance with one or more aspects described herein. Referring to FIG. 1A, computing environment 100 may include one or more computing devices and/or other computing systems. For example, computing environment 100 may include a dynamic interface functionality computing platform 110, an unauthorized user detection engine computer system 120, a first local user computing device 150, a second local user computing device 155, a first remote user computing device 170, and a second remote user computing device 175.

Dynamic interface functionality enablement computing platform 110 may be configured to provide dynamic user interface enabling and/or disabling functions. In some examples, a request to authenticate a user may be received. The request may be received using credentials of a user, such as a username and password, personal identification number (PIN), biometric data, or the like. If the request to authenticate the user is received from a user that is likely an authorized user (or acting on behalf of or with the permission of an authorized user) and the user is authenticated (e.g., received credentials match pre-stored credentials) a user interface may be provided to the user. The dynamic interface functionality enablement computing platform 110 may enable functionality associated with the user interface. For instance, the user interface may include a plurality of interactive elements, each interactive element being associated with one or more functions available to the user for selection. If the user is authenticated, the functionality associated with the interactive elements may be enabled. Accordingly, upon selection of one of the interactive user elements, functionality may be provided to the requesting user.

If the request to authenticate the user is received from a device or user identified as potentially unauthorized (e.g., a user attempting to access functionality without being an authorized user or acting on behalf of or with the permission of an authorized user), a decoy user interface may be provided to the unauthorized user. In some examples, the decoy user interface may be provided to the requesting user regardless of whether the credentials provided by the unauthorized user match pre-stored credentials (e.g., even if the requesting user does not possess credentials to access the functionality, if the user is identified as potentially unauthorized, the decoy user interface may be presented).

In some arrangements, the decoy user interface may have an appearance the same as or substantially similar to an appearance of the user interface provided to the authorized, authenticated user. However, functionality associated with one or more of the interactive user elements may be disabled. Accordingly, selection of an interactive element may result in, for example, no further action being taken (e.g., a selection made by a user might not be implemented), one or more additional decoy interfaces being provided to the user, or the like. In some examples, selections made by the unauthorized user via the decoy user interface (e.g., selection of one or more interactive elements) may be recorded by the dynamic interface functionality enablement computing platform 110 for use in updating and/or validating one or more machine learning datasets, identifying future unauthorized users, predicting additional actions an unauthorized user may take, and the like.

The unauthorized user detection engine computer system 120 may include one or more computing devices connected to or in communication with the dynamic interface functionality enablement computing platform 110 and configured to evaluate requests to access functionality associated with one or more user interfaces (e.g., requests to login in to an online application executing on a computing device, requests to login to a mobile application executing on a mobile computing device, or the like). In some examples, the unauthorized user detection engine computer system 120 may receive data associated with a request to access functionality associated with a user interface. The data may include user login credentials, as well as data associated with a device from which the request is being received. For instance, an internet protocol (IP) address of a device from which a request is received, global positioning system (GPS) data associated with a location of the device from which the request is received, and the like. The unauthorized user detection engine computer system 120 may evaluate the data (e.g., using one or more machine learning datasets) to determine whether the user from which the request is received is potentially an unauthorized user (e.g., a user other than an authorized user and/or a user acting without the knowledge or permission of an authorized user).

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control aspects associated with evaluating potential unauthorized users, enabling and/or disabling functionality associated with a user interface, and the like. For instance, local user computing device 150, 155 may be used by an authorized user (e.g., a system administrator) to modify one or more settings associated with dynamic interface functionality enablement computing platform 110, unauthorized user detection engine computer system 120, and the like.

The remote user computing devices 170, 175 may be used to communicate with, for example, dynamic user interface functionality enablement computing platform 110. For instance, remote user computing devices 170, 175 may be used to attempt to access functionality provided by one or more interfaces. Requests to access functionality (e.g., by an authorized user and/or an unauthorized user) may be received from remote user computing devices 170, 175 and transmitted to the unauthorized user detection engine computer system 120 and/or the dynamic interface functionality enablement computing platform 110.

In one or more arrangements unauthorized user detection engine computer system 120, local user computing device 150, local user computing device 155, remote user computing device 170, and/or remote user computing device 175 may be any type of computing device or combination of devices capable of performing the particular functions described herein. For example, unauthorized user detection engine computer system 120, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of unauthorized user detection engine computer system 120, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic interface functionality enablement computing platform 110. As illustrated in greater detail below, dynamic interface functionality enablement computing platform 110 may include one or more computing devices configured to perform one or more of the functions described herein. For example, dynamic interface functionality enablement computing platform 110 may include one or more computers (e.g., laptop computers, desktop computers, servers, server blades, or the like).

As mentioned above, computing environment 100 also may include one or more networks, which may interconnect one or more of dynamic interface functionality enablement computing platform 110, unauthorized user detection engine computer system 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic interface functionality enablement computing platform 110, unauthorized user detection engine computer system 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic interface functionality enablement computing platform 110, unauthorized user detection engine computer system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., dynamic interface functionality enablement computing platform 110, unauthorized user detection engine computer system 120, local user computing device 150, and/or local user computing device 155) with one or more networks and/or computing devices that are not associated with the organization. For example remote user computing device 170 and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., dynamic interface functionality enablement computing platform 110, unauthorized user detection engine computer system 120, local user computing device 150, and/or local user computing device 155).

Referring to FIG. 1B, unauthorized user detection engine computer system 120 may include one or more processors 121, memory 122, and communication interface 123. A data bus may interconnect processor(s) 121, memory 122, and communication interface 123. Communication interface 123 may be a network interface configured to support communication between unauthorized user detection engine computer system 120 and one or more networks (e.g., private network 190, public network 195, or the like). Memory 122 may include one or more program modules having instructions that when executed by processor(s) 121 cause unauthorized user detection engine computer system 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of unauthorized user detection engine computer system 120 and/or by different computing devices that may form and/or otherwise make up unauthorized user detection engine computer system 120.

For example, memory 122 may have, store, and/or include an unauthorized user detection engine 122a. Unauthorized user detection engine 122a may predict, based on one or more machine learning datasets 122c a likelihood that a user requesting access to an application, interface or the like, or requesting functionality associated with an interface, application, or the like, is an unauthorized user. For instance, the unauthorized user detection engine 122a may receive information from a user requesting access, such as user credentials including username and password, personal identification number (PIN), biometric data, and the like. The unauthorized user detection engine 122a may also receive data from the device from which the request is being received. For instance, an internet protocol (IP) address associated with the device, GPS data associated with a location of the device, and the like, may be received. The unauthorized user detection engine 122a may analyze this information, as well as other information, such as a number of times a request for access has been received from the IP address within a predefined time period, and the like, and may determine, based on the received data and/or one or more machine learning datasets 122c, a likelihood that the request is from an unauthorized or potentially unauthorized user.

The unauthorized user detection engine computer system 120 may further have, store, and/or include a machine learning engine 122b and machine learning datasets 122c. Machine learning engine 122b and machine learning datasets 122c may store instructions and/or data that cause or enable unauthorized user detection engine computer system 120 to receive data from one or more sources, evaluate or analyze the data, generate one or more machine learning datasets, and the like. The machine learning datasets 122c may be generated based on analyzed data (e.g., data from previously received data, and the like), raw data, and/or received from one or more outside sources.

The machine learning engine 122b may receive data and, using one or more machine learning algorithms, may generate one or more machine learning datasets 122c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 122b may analyze data to identify patterns of activity, sequences of activity, and the like, to generate one or more machine learning datasets 122c.

The machine learning datasets 122c may include machine learning data linking one or more locations, IP addresses, number of attempted logins within a predefined time period from a same IP address, number of attempted logins using different credentials from a same IP address, and the like, to a particular type of user (e.g., authorized vs. unauthorized or potentially unauthorized). For instance, if a plurality of different login credentials are used to request access from a same IP address within a predefined time period (e.g., one day, one hour, six hours, one week, or the like), the user is likely an unauthorized user executing a script to attempt to verify validity of one or more sets of login credentials (e.g., credentials obtained without authorization from an authorized user). Accordingly, the machine learning engine 122b may generate one or more machine learning datasets 122c linking the attempt to authenticate a plurality of different login credentials from a same IP address in a predefined time period as being an unauthorized user.

In another example, if one or more requests for access (e.g., login attempts) are received from a location (e.g., based on GPS data received from the device transmitting the request) that typically associated with an authorized user, or associated with locations known to harbor or be associated with unauthorized users, one or more machine learning datasets 122c may be generated linking the location to a likelihood that the requesting user is an authorized user.

Various other examples of generating machine learning datasets and linking data from historical requests for access, and the like, may be used without departing from the invention.

The machine learning datasets 122c may be updated and/or validated based on subsequent data received, for example, after a user is identified as authorized or unauthorized, after a decoy interface has been generated and selections made via the decoy user interface are captured, and the like.

As discussed above, the machine learning datasets 122c may be used by, for instance, the unauthorized user detection engine 122a to evaluate requests for access and/or functionality and determine whether the requesting user is an authorized user or an unauthorized user. The result of the determination may be provided as an output generated by, for example, output generation module 122d. Output generation module 122d may have or store instructions and/or data that may cause or enable the unauthorized user detection engine computer system 120 to transmit a signal, instruction or command including the output to, for example, the dynamic interface functionality enablement computing platform 110 for use in generating an appropriate interface (e.g., authenticate interface, decoy interface, and the like).

Figure 1C:
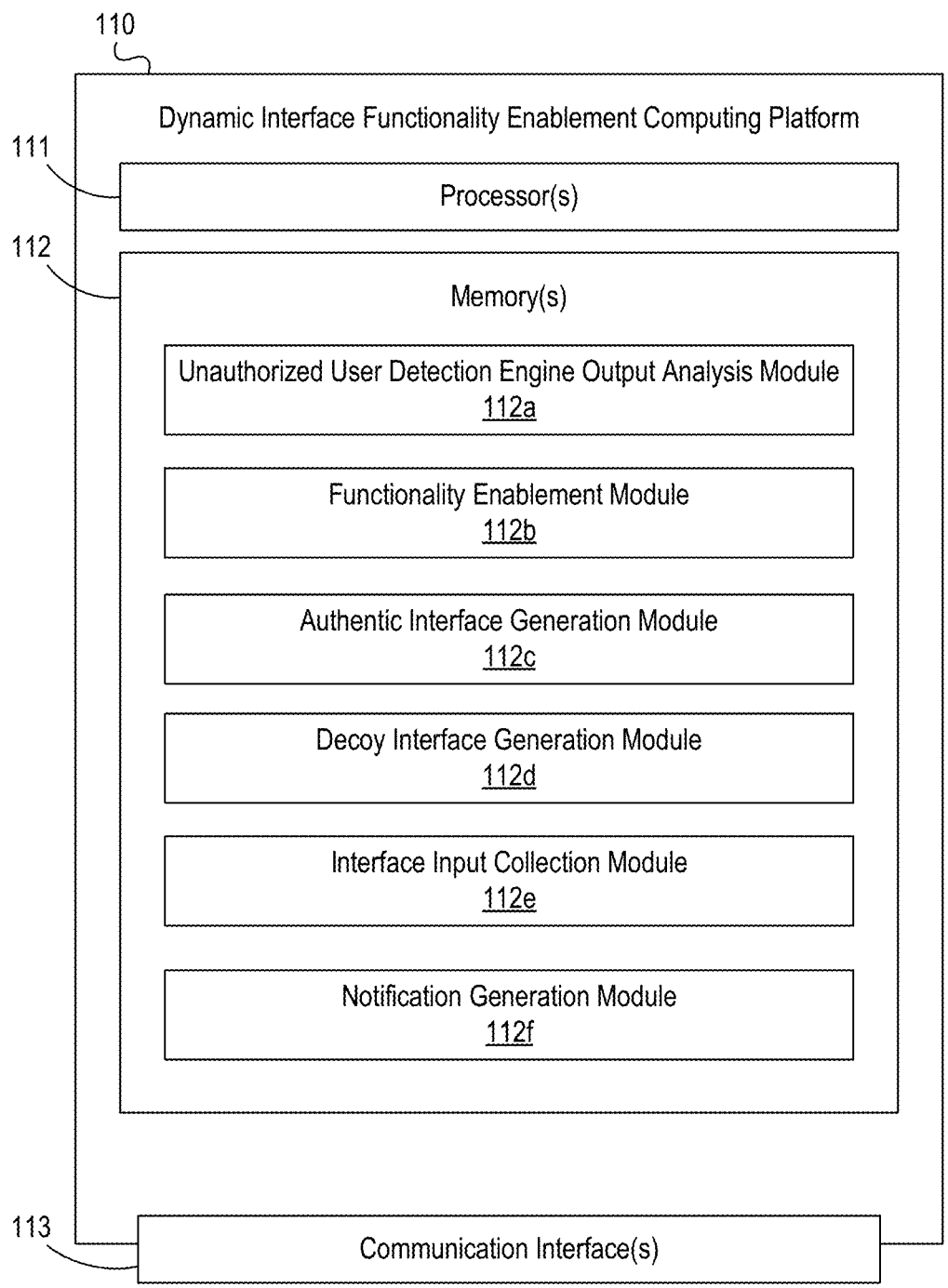

Referring to FIG. 1C, a dynamic interface functionality enablement computing platform 110 is provided. While the dynamic interface functionality enablement computing platform 110 is shown and discussed as a device separate from the unauthorized user detection engine computer system 120, the unauthorized user detection engine computer system 120 may be a part of the dynamic interface functionality enablement computing platform 110, may be part of a same physical device, or the like.

The dynamic interface functionality enablement computing platform 110 may include one or more processors 111, memory 112, and communication interface 113. A data bus may interconnect processor(s) 111, memory 112, and communication interface 113. Communication interface 113 may be a network interface configured to support communication between dynamic interface functionality enablement computing platform 110 and one or more networks (e.g., private network 190, public network 195, or the like). Memory 112 may include one or more program modules having instructions that when executed by processor(s) 111 cause dynamic interface functionality enablement computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic interface functionality enablement computing platform 110 and/or by different computing devices that may form and/or otherwise make up dynamic interface functionality enablement computing platform 110.

For example, memory 112 may have, store, and/or include an unauthorized user detection engine output analysis module 112a. The unauthorized user detection engine output analysis module 112a may store instructions and/or data that may cause or enable the dynamic interface functionality enablement computing platform 110 to receive, from, for example, the unauthorized user detection engine computer system 120, an output generated by the computer system 120 indicating a likelihood that a user requesting access is an authorized user or an unauthorized user. Upon determining whether the user is likely an authorized user or unauthorized user, the output may be transmitted to the dynamic interface functionality enablement computing platform 110 and received and analyzed by the unauthorized user detection engine output analysis module 112a to identify a type of interface to generate and/or provide to the user. In examples, in which a request is identified as received from an authorized user, the credentials associated with the user may be transmitted to the unauthorized user detection engine output analysis module 112a for comparison to pre-stored credentials (e.g., stored in, for example, the unauthorized user detection engine output analysis module 112a, a database associated therewith, or the like) of the user in order to authenticate the user.

Memory 112 may further have, store and/or include a functionality enablement module 112b. Functionality enablement module 112b may store instructions and/or data that may cause or enable the dynamic interface functionality enablement computing platform 110 to enable or disable functionality associated with one or more user interfaces. For instance, unauthorized user detection engine output analysis module 112a may transmit a command or instruction to the functionality enablement module 112b indicating how much and/or what type of functionality to enable for a user interface, functions to be disabled, and the like.

Dynamic interface functionality enablement computing platform 110 may further have, store and/or include an authentic interface generation module 112c. Authentic interface generation module 112c may store instructions and/or data that may cause or enable the dynamic interface functionality enablement computing platform 110 to generate (e.g., based on an output provided by the unauthorized user detection engine computer system 120, analysis provided by the unauthorized user detection engine output analysis module 112a, and/or the functionality enablement module 112b) an authentic user interface. In at least some examples, an authentic user interface may be a user interface that is authentic to the executed application and includes functionality expected of the user interface (e.g., based on interactive elements provided in the interface). In some examples, the authentic user interface may be generated and/or displayed to a user upon determining that the user is not likely an unauthorized user and upon authenticating credentials provided by the user. The authentic user interface may include interactive elements that, when selected by a user, may provide functionality to the user (e.g., generate additional interfaces, provide requested data, modify data as requested, and the like).

Dynamic interface functionality enablement computing platform 110 may further have, store and/or include a decoy interface generation module 112d. Decoy interface generation module 112d may store instructions and/or data that may cause or enable the dynamic interface functionality enablement computing platform 110 to generate (e.g., based on an output provided by the unauthorized user detection engine computer system 120, analysis provided by the unauthorized user detection engine output analysis module 112a, and/or the functionality enablement module 112b) a decoy user interface. In at least some examples, a decoy user interface may be a user interface that has a same or substantially similar appearance as the authentic user interface and may include one or more interactive elements that have a same or similar appearance to the interactive elements in the authentic interface. However, the interactive elements provided in the decoy user interface might not provide any functionality to the user. For instance, a user may select an interactive element but no functionality may be provided, additional decoy user interfaces may be generated and provided to the user, false or other decoy actions may be taken, or the like. However, the functionality expected upon selection of the interactive element may be disabled. Accordingly, an unauthorized user may believe that he or she has been authenticated and is accessing functionality, but the functionality is not enabled and only decoy interfaces and/or data are being provided to the unauthorized user.

In some examples, the decoy user interface may be generated and/or displayed to a user upon determining that the user is likely an unauthorized user. Accordingly, even if the unauthorized user provides authenticated credentials (e.g., credentials that match pre-stored credentials), if the system determines that the user is likely unauthorized, the decoy interface may be generated. Thus, for unauthorized users that purchase or otherwise obtain credentials of users via unauthorized means, the unauthorized users may be recognized and will be prevented from accessing authentic information of the user. In addition, by providing access to the decoy interface, the unauthorized users may believe that they are able to access functionality and may continue to make selections via the user interface. Accordingly, the system may track the actions taken, gather additional data, and the like, that may be used to identify the unauthorized users, identify a location of the users, update and/or validate machine learning datasets to identify potential unauthorized users, and the like.

For instance, dynamic interface functionality enablement computing platform 110 may further include an interface input collection module 112e. The interface input collection module 112e may store instructions and/or data that may cause or enable the dynamic interface functionality enablement computing platform 110 to track or collect selections made via a decoy user interface. For instance, selection of one or more options or interactive elements on the decoy interface may be collected and used to update and/or validate one or more machine learning datasets, gather information about actions unauthorized users are likely to take, and the like. This information may then be used to thwart attacks by unauthorized users, and the like.

Dynamic interface functionality enablement computing platform 110 may further have, store and/or include a notification generation module 112f. The notification generation module 112f may store instructions and/or data that may cause or enable the dynamic interface functionality enablement computing platform 110 to generate one or more notifications and transmit the notifications to a user device for display. For instance, if an unauthorized user is detected, a notification may be generated and transmitted to a user device associated with an authorized user (e.g., a pre-registered device, a device from which the authorized user has logged in previously, or the like). The notification may include an indication that an unauthorized user has been detected, a request for confirmation that an authorized user is not attempting to access the functionality, or the like.

Figure 2A:
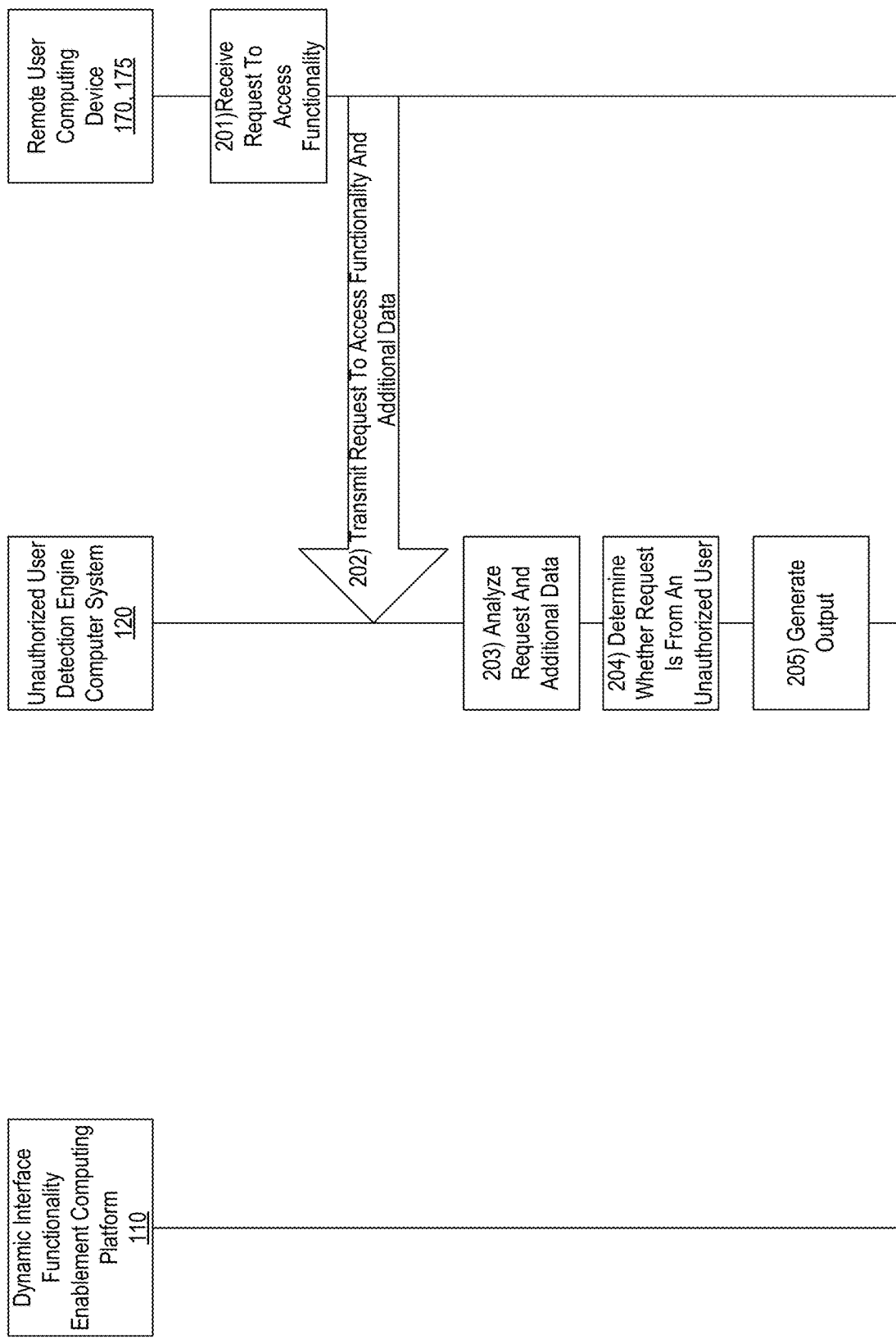

FIGS. 2A-2C depict an illustrative event sequence for implementing and using dynamic unauthorized user detection and interface functionality enablement functions in accordance with one or more aspects described herein. The events shown in the illustrative event sequence are merely one example sequence and additional events may be added, or events may be omitted, without departing from the invention.

Referring to FIG. 2A, at step 201, a request to access functionality may be received. For instance, the request to access functionality may be received by, for example, a remote user computing device 170, 175, such as a mobile device or other computing device of a user. The request to access functionality may be received by an application executing on the remote user computing device 170, 175, and may include credentials or other login information of a user, as discussed herein.

In step 202, the request to access functionality may be transmitted to an unauthorized user detection engine computer system 120. The request may include the user credentials, as well as additional information associated with the request, such as an internet protocol (IP) address associated with the device at which the request was received (e.g., remote user computing device 170, 175), GPS data indicating a location of the device at which the request was received, and the like.

At step 203, the request and associated data may be analyzed. In some examples, the request, including the user credentials and additional information, may be analyzed using one or more machine learning datasets. The data may be compared to data in the one or more datasets to determine whether the user requesting access is, or is likely to be, an authorized user or an unauthorized user in step 204. In step 205, an output including the determination may be generated.

With reference to FIG. 2B, in step 206, the generated output may be transmitted to the dynamic interface functionality enablement computing platform 110. For instance, the output, including the determination of whether the user requesting access is, or is likely to be, an authorized user or an unauthorized user, may be transmitted to the dynamic interface functionality enablement computing platform 110.

In step 207, the transmitted output may be received by the dynamic interface functionality enablement computing platform and analyzed. For instance, the determination may be analyzed to evaluate whether the user is authorized or unauthorized. If an authorized user, the credentials may be compared to pre-stored credentials associated with the user in order to authenticate the user.

In step 208, functionality associated with one or more interfaces may be enabled or disabled based on the analysis performed in step 207. For instance, if the user is authorized and authenticated, an authentic interface may be generated in step 209. Alternatively, if the user is not authorized, even, in some examples, if the credentials provided by the unauthorized user match pre-stored credentials such that the user could be authenticated, a decoy interface may be generated in step 209. The functionality associated with interactive elements in each interface may be enabled or disabled at step 207 to either permit access to functionality for an authorized and authenticated user or prevent access to functionality (and/or provide access to decoy functionality) for an unauthorized user.

At step 210, the generated interface (e.g., authentic or decoy) may be transmitted to the remote user computing device 170, 175 and may be displayed on the remote user computing device 170, 175 in step 211.

With reference to FIG. 2C, at step 212, the remote user computing device 170, 175 may receive user input including selection of one or more interactive elements displayed on the interface (e.g., the authentic or decoy interface depending on the determination and functionality enabled). If the user interface is an authentic interface, in step 213, the enabled functionality associated with the selected interactive element may be provided to the user.

If the user interface is a decoy interface, in step 214, user input including selections of one or more interactive elements may be collected. In some examples, decoy functionality may be enabled and associated with one or more interactive elements. For instance, selection of an option to "transfer funds" on the authentic interface may permit a user to transfer funds from one location to another. Alternatively, selection of the option to "transfer funds" on the decoy element may cause an error message to appear, may prompt display of additional decoy interfaces that may appear to provide functionality associated with transferring funds but without actually transferring funds, or the like.

In step 215, the user input received from either the authentic interface or the decoy interface may be transmitted to the unauthorized user detection engine computer system 120. In step 216, the transmitted data may be received and may be used to update and/or validate one or more machine learning datasets. For instance, the data may be used to validate that a user was, in fact, authorized or unauthorized, may be used to update machine learning datasets to identify unauthorized user by analyzing the collected user input selections made via the decoy interface, or the like.

Figure 3:
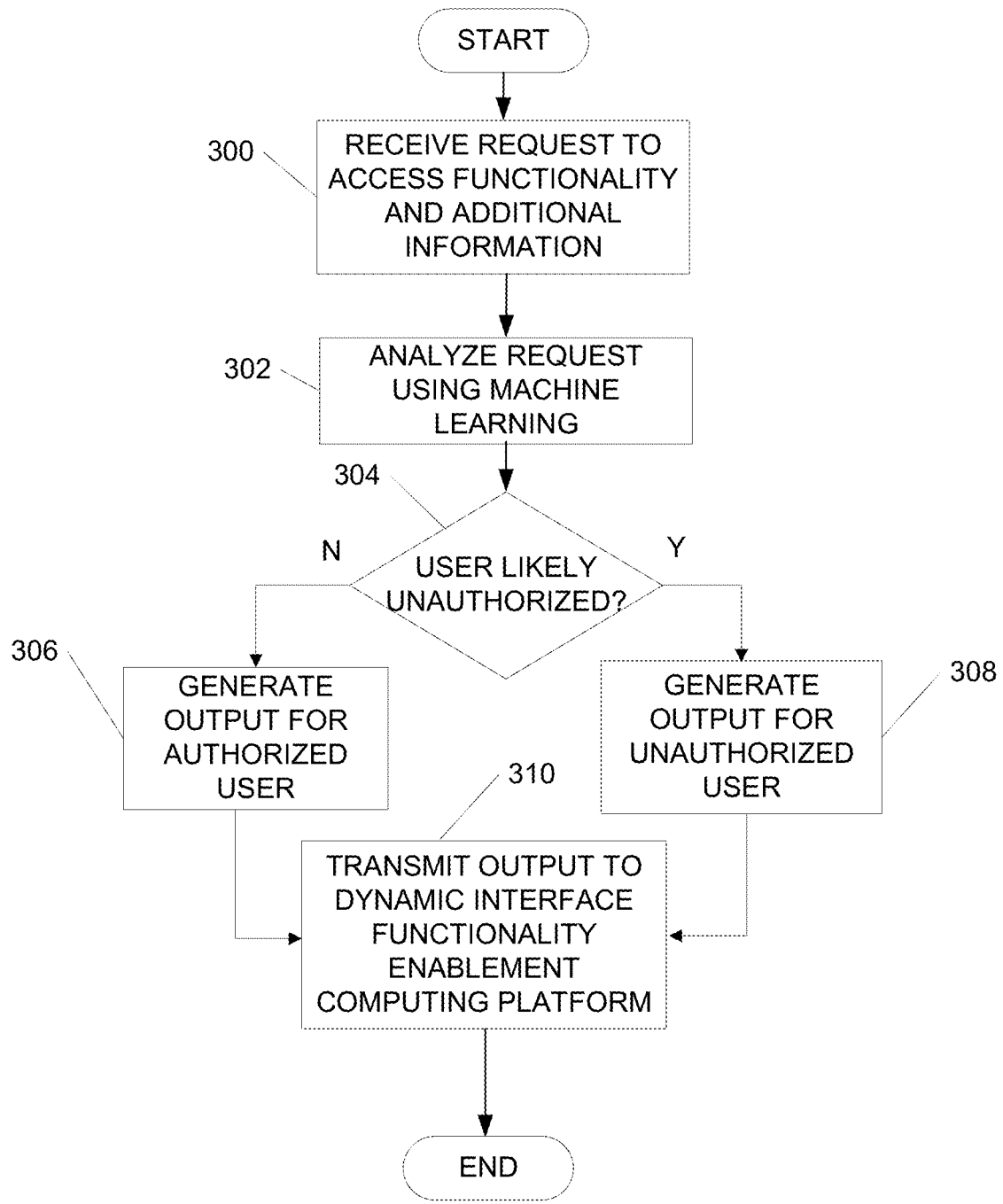
FIG. 3 depicts an illustrative method for implementing and using a system to perform unauthorized user detection functions, according to one or more aspects described herein.

FIG. 3 is a flow chart illustrating one example method of implementing unauthorized user detection functions according to one or more aspects described herein. The processes illustrated in FIG. 3 are merely some example processes and functions. The steps shown may be performed in a different order, more steps may be added, or one or more steps may be omitted without departing from the invention.

In step 300, a request to access functionality may be received. The request may be received, for example, by unauthorized user detection engine computer system 120, and may include additional information as discussed above, such as IP address of the device from which the request is received, location information, and the like.

At step 302, the received information may be analyzing using one or more machine learning datasets to determine whether a user requesting access or functionality is an authorized user or an unauthorized user. At step 304, a determination may be made as to whether the user is, or likely is, an unauthorized user. If so, an output may be generated indicating that the user requesting access is, or is likely, an unauthorized user at step 308.

If, at step 304, a determination is made that the user is or is likely an authorized user, an output indicating that the user is, or is likely, an authorized user may be generated at step 306.

At step 310, the generated output (e.g., either authorized user or unauthorized user) may be transmitted to the dynamic interface functionality enablement computing platform 110.

Figure 4:
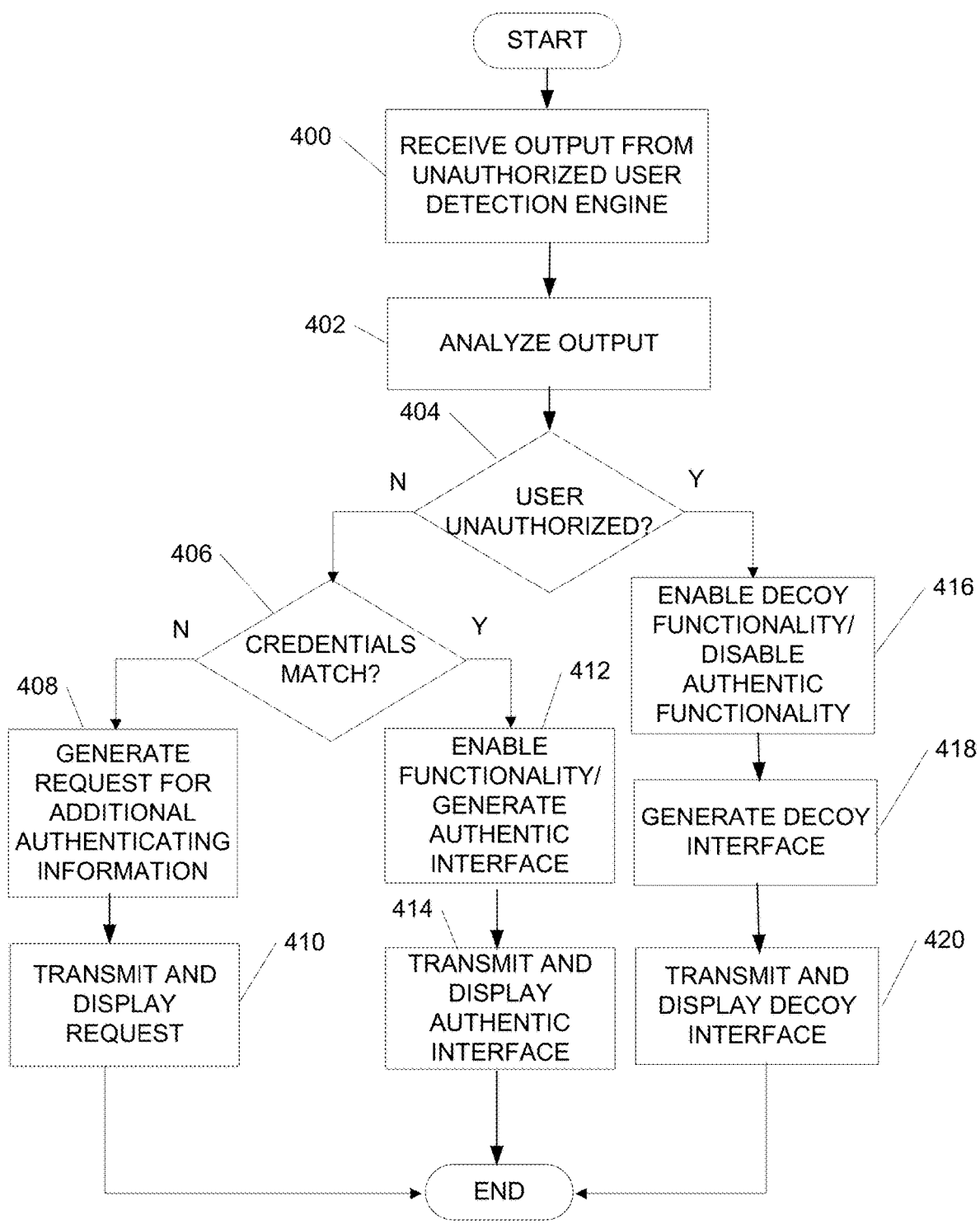
FIG. 4 illustrates an illustrative method for implementing and using a system to perform dynamic interface control functions, according to one or more aspects described herein.

FIG. 4 is a flow chart illustrating one example method of implementing dynamic interface functionality enablement functions according to one or more aspects described herein. The processes illustrated in FIG. 4 are merely some example processes and functions. The steps shown may be performed in a different order, more steps may be added, or one or more steps may be omitted without departing from the invention.

In step 400, an output may be received from the dynamic interface functionality enablement computing platform 110. In some examples, the output may be received from the unauthorized user detection engine computer system 120. In step 402, the output may be analyzed to determine whether the output indicates a user is authorized or unauthorized.

In step 404, a determination may be made as to whether the output indicates that the user was authorized or unauthorized. If, in step 404, a determination is made that the user is unauthorized, at step 416, decoy functionality may be enabled and/or one or more features or functions associated with an interface may be disabled. For instance, decoy functionality such as interfaces that appear similar to authentic interfaces but do not provide the expected functionality may be enabled, functionality associated with an authentic interface may be disabled (e.g., functionality associated with transferring funds, withdrawing funds, changing address, and the like).

At step 418, a decoy interface may be generated. As discussed herein, the decoy interface may have a same or substantially similar appearance to an authentic interface but might not provide the functionality expected or generally provided with an authentic interface. At step 420, the decoy interface may be transmitted to a remote user computing device and may be displayed on the device.

If, at step 404, the user is an authorized user, a determination may be made at step 406 as to whether received credentials match pre-stored credentials for the authorized user. If so, functionality associated with an interface (and/or application associated with the interface) may be enabled and an authentic interface may be generated at step 412. At step 414, the authentic interface may be transmitted to a remote user computing device and displayed on the remote user computing device.

If, at step 406, the received credentials do not match pre-stored credentials, a request for additional input, such as additional authenticating information, may be generated at step 408. At step 410, the request for additional input may be transmitted to a remote user computing device and displayed on the remote user computing device.

Figure 5B:
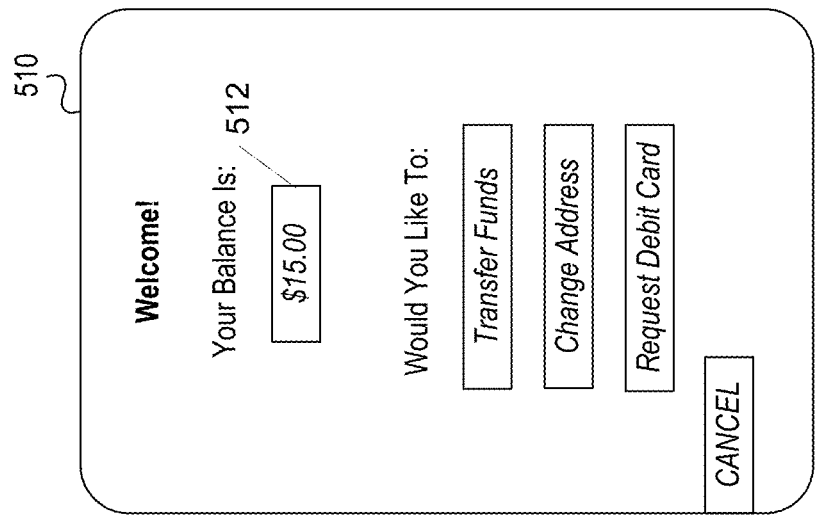
FIGS. 5A and 5B illustrate example authentic and decoy user interfaces, respectively, that may be used with various aspects described herein.
Figure 5A:
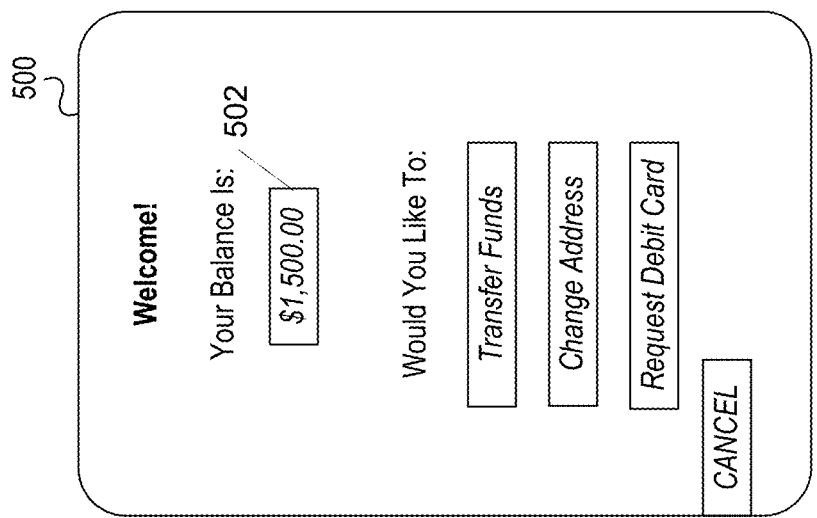

FIGS. 5A and 5B illustrate example authentic and decoy interfaces, respectively. FIG. 5A includes authentic interface 500, while FIG. 5B includes decoy interface 510. As shown in FIGS. 5A and 5B, the interfaces 500, 510 have substantially similar appearances in order to convince the unauthorized user that the decoy interface is an authentic interface. However, decoy information is provided in the decoy interface 510 in order to provide less incentive to the unauthorized user to take action. For example, authentic interface 500 indicates an account balance of $1,500 in field 502. This balance may be sufficient incentive to an unauthorized user to attempt to withdraw or transfer funds or take other action. However, decoy interface 500 displays a decoy balance amount of $15.00 in field 512. This lower, decoy amount may discourage the unauthorized user from attempting to withdraw funds.

In some examples, authentic interface 500 may include interactive elements having enabled functionality to transfer funds, change address, and/or request a new debit card. Various other interactive elements including additional functionality may be provided without departing from the invention. Selection of one or more of the interactive elements from the authentic interface may provide functionality expected from the element. Decoy interface 510 may include the same or substantially similar interactive elements. However, selection of one or more of the interactive elements from the decoy interface may provide no functionality (e.g., no additional interfaces or options may be displayed), may cause display of additional decoy interfaces that appear similar to authentic interfaces but do not have expected functionality enabled or include additional decoy information, or the like.

As discussed herein, the arrangements described provide for identification of a user requesting access or functionality as an authorized or unauthorized user and providing authentic or decoy information based on the identification. As discussed above, conventional systems may provide requested access or functionality based, in at least some examples, solely on a user having authentic credentials. However, unauthorized users often purchase or otherwise obtain authentic credentials and run an automated script to attempt to login or request access or functionality using each set of credentials in order to confirm authenticity of each set. Accordingly, unauthorized user may be able to access functionality by using the credentials obtained without the permission of an authorized user.

The arrangements described herein provide for identifying a user as unauthorized and providing decoy interfaces and/or other information in order to thwart any unauthorized activity and/or mitigate damage caused by the unauthorized activity. In some examples, a user may be identified as unauthorized based on GPS location data associated with the requesting computing device (e.g., velocity between locations for multiple logins), a number of attempted logins from a particular IP address, a time between login and logout (e.g., if less than a predetermined threshold then likely an unauthorized user testing credentials), number of failed login attempts from an IP address (e.g., if percentage of failed login attempts from IP address is greater than threshold then user is likely unauthorized), and the like. In some examples, unauthorized users may use multiple machines to attempt thousands or tens of thousands of logins. Accordingly, the server IP address may be identified and used to evaluate the attempted logins.

In some examples, unauthorized users may be identified based on browser characteristics. For instance, an automated script may execute similar to authentic browser behaviors. However, come characteristics of the browser may only mimic the authentic characteristics. For instance, header values, sequences, and the like, may be compared to authentic data to identify unauthorized users.

If a user is identified as unauthorized, a decoy interface may be provided. For instance, functionality associated with an authentic interface may be disabled and a decoy interface having a substantially similar appearance may be provided to the user. The decoy interface may be hosted by a same server as the authentic interface. The selections made by the user via the decoy interface may be collected and used to gather intelligence associated with the unauthorized user. For instance, data associated with types of actions or selections made, a computing device fingerprint, device characteristics, and the like. In some examples, the device characteristics may be used to prevent the identified device from logging in at a future time (e.g., the device may be added to a deny list).

Although several examples described herein are directed to users attempting to access data via an online or mobile application, aspects described herein may be used to identify unauthorized users attempting to access functionality via a call center. For instance, an unauthorized user may contact a call center to request a password reset or one-time password to access an online or mobile application. In examples in which the user is an unauthorized user, a call center associate might not recognize the user as unauthorized since the user may have verifying information such as a date of birth, social security number, or the like (e.g., verifying information obtained without authorization from an authorized user). However, the arrangements discussed herein may be used to identify a user as unauthorized (e.g., based on a phone number from which a call is received, an IP address, or other identifying information). If so, a false one-time password, false challenge question, or the like, may be provided and the user may use the false password to login to a decoy interface in order to capture additional information about the unauthorized user.

Figure 6:
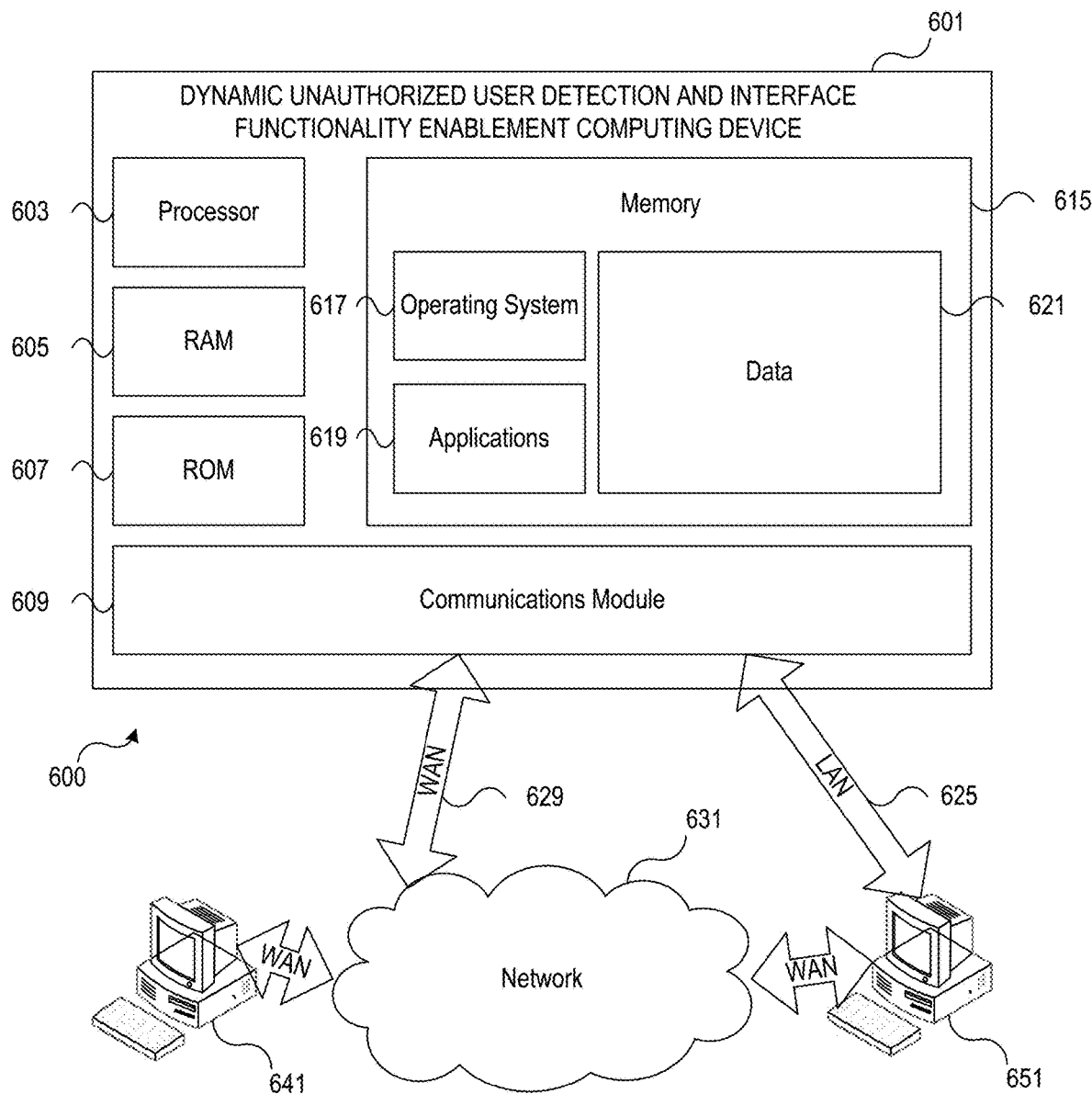
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic unauthorized user detection and interface functionality enablement computing device 601 having processor 603 for controlling overall operation of dynamic unauthorized user detection and interface functionality enablement computing device 601 and its associated components, including Random Access Memory (RAM) 605, Read-Only Memory (ROM) 607, communications module 609, and memory 615. Dynamic unauthorized user detection and interface functionality enablement computing device 601 may include a variety of computer readable media. Computer readable media may be any available media that may be accessed by dynamic unauthorized user detection and interface functionality enablement computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic unauthorized user detection and interface functionality enablement computing device 601. Such a processor may execute computer-executable instructions stored on a computer-readable medium.

Software may be stored within memory 615 and/or storage to provide instructions to processor 603 for enabling dynamic unauthorized user detection and interface functionality enablement computing device 601 to perform various functions as discussed herein. For example, memory 615 may store software used by dynamic unauthorized user detection and interface functionality enablement computing device 601, such as operating system 617, application programs 619, and associated database 621. Also, some or all of the computer executable instructions for dynamic unauthorized user detection and interface functionality enablement computing device 601 may be embodied in hardware or firmware. Although not shown, RAM 605 may include one or more applications representing the application data stored in RAM 605 while dynamic unauthorized user detection and interface functionality enablement computing device 601 is on and corresponding software applications (e.g., software tasks) are running on dynamic unauthorized user detection and interface functionality enablement computing device 601.

Communications module 609 may include a microphone, keypad, touch screen, and/or stylus through which a user of dynamic unauthorized user detection and interface functionality enablement computing device 601 may provide input, and may also include one or more of a speaker for providing audio output and a video display device for providing textual, audiovisual and/or graphical output. Computing system environment 600 may also include optical scanners (not shown).

Dynamic unauthorized user detection and interface functionality enablement computing device 601 may operate in a networked environment supporting connections to one or more remote computing devices, such as computing devices 641 and 651. Computing devices 641 and 651 may be personal computing devices or servers that include any or all of the elements described above relative to dynamic unauthorized user detection and interface functionality enablement computing device 601.

The network connections depicted in FIG. 6 may include Local Area Network (LAN) 625 and Wide Area Network (WAN) 629, as well as other networks. When used in a LAN networking environment, dynamic unauthorized user detection and interface functionality enablement computing device 601 may be connected to LAN 625 through a network interface or adapter in communications module 609. When used in a WAN networking environment, dynamic unauthorized user detection and interface functionality enablement computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
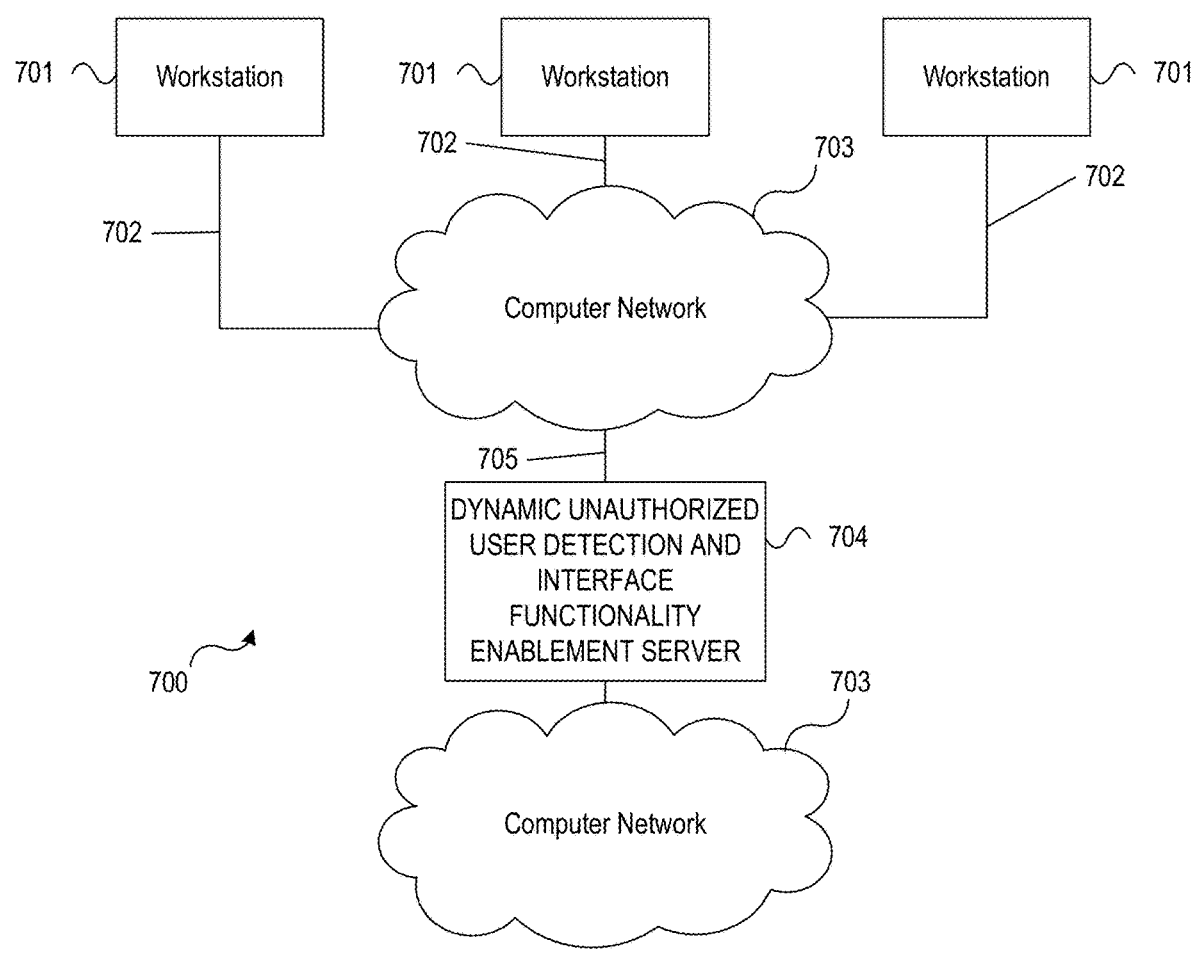
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic unauthorized user detection and interface functionality enablement server 704. In system 700, dynamic unauthorized user detection and interface functionality enablement server 704 may be a server, processor, computer, or data processing device, or combination of the same, configured to perform the functions and/or processes described herein. Server 704 may be used to receive requests to provide functionality, determine whether a user is authorized, generate an output, enable or disable functionality, generate a user interface, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic unauthorized user detection and interface functionality enablement server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive a request to access functionality from a user computing device, the request including login credentials of a user;
   receive additional information associated with the user computing device, the additional information including data associated with a plurality of different login credentials requesting to access functionality from a same internet protocol address in a predefined time period;

analyze, using one or more machine learning datasets, the request to access functionality and the additional information to determine whether the request includes authentic login credentials and is received from an authorized user or an unauthorized user;

responsive to determining that the request includes authentic login credentials and is from an authorized user:
  authenticating the user;
  generating an authentic user interface including a plurality of interactive interface elements configured for display in the authentic user interface; and
  transmitting the authentic user interface to the user computing device;

responsive to determining that the request includes authentic login credentials and is from an unauthorized user:
  disabling functionality associated with the plurality of interactive interface elements configured for display in the authentic user interface; and
  generating a decoy user interface including the plurality of interactive interface elements having disabled functionality and having an appearance similar to the authentic user interface; and
  transmitting the decoy user interface to the user computing device.

2. The computing platform of claim 1, wherein determining whether the request includes authentic login credentials includes:
  comparing the received login credentials to pre-stored login credentials;
  determining, based on the comparing, whether the received login credentials match the pre-stored login credentials;
  responsive to determining that the received login credentials match the pre-stored login credentials, determining that the received login credentials are authentic; and
  responsive to determining that the received login credentials do not match the pre-stored login credentials, determining that the received login credentials are not authentic.

3. The computing platform of claim 2, further including instructions that, when executed, cause the computing platform to:
  after authenticating the user:
    enabling functionality associated with the plurality of interactive interface elements; and
    generating the authentic user interface including the plurality of interactive interface elements having enabled functionality.

4. The computing platform of claim 1, wherein disabling functionality of the plurality of interactive interface elements further includes enabling decoy functionality associated with at least one interactive interface element of the plurality of interactive elements.

5. The computing platform of claim 1, further including instructions that, when executed, cause the computing platform to:
  responsive to determining that the request includes authentic login credentials and is from an unauthorized user:
    receive user input from the user computing device selecting at least one interactive interface element of the plurality of interactive interface elements having disabled functionality;
    capturing the selection of the at least one interactive interface element;
    updating at least one machine learning dataset based on the captured selection; and
    causing display of a second decoy user interface having an appearance of functionality but not providing functionality.

6. The computing platform of claim 1, wherein the login credentials include at least one of: a username, a password, a personal identification number, and biometric data.

7. The computing platform of claim 1, wherein the additional information further includes at least one of: an internet protocol (IP) address of the user computing device and global positioning system (GPS) data associated with a location of the user computing device.

8. The computing platform of claim 1, wherein analyzing, using one or more machine learning datasets, the request to access functionality and the additional information to determine whether the request includes authentic login credentials and is received from an authorized user or an unauthorized user further includes evaluating browser characteristics to identify an unauthorized user.

9. A method, comprising:
  at a computing platform comprising at least one processor, memory, and a communication interface:
    receiving, by the at least one processor and via the communication interface, a request to access functionality from a user computing device, the request including login credentials of a user;
    receiving, by the at least one processor and via the communication interface, additional information associated with the user computing device, the additional information including data associated with a plurality of different login credentials requesting to access functionality from a same internet protocol address in a predefined time period;
    analyzing, by the at least one processor and using one or more machine learning datasets, the request to access functionality and the additional information to determine whether the request includes authentic login credentials and is received from an authorized user or an unauthorized user;
    responsive to determining that the request includes authentic login credentials and is from an authorized user:
      authenticating, by the at least one processor, the user;
      generating, by the at least one processor, an authentic user interface including a plurality of interactive interface elements configured for display in the authentic user interface; and
      transmitting the authentic user interface to the user computing device;
    responsive to determining that the request includes authentic login credentials and is from an unauthorized user:
      disabling, by the at least one processor, functionality associated with the plurality of interactive interface elements configured for display in the authentic user interface; and
      generating, by the at least one processor, a decoy user interface including the plurality of interactive interface elements having disabled functionality and having an appearance similar to the authentic user interface; and
      transmitting, by the at least one processor and via the communication interface, the decoy user interface to the user computing device.

10. The method of claim 9, wherein determining whether the request includes authentic login credentials further includes:

comparing, by the at least one processor, the received login credentials to pre-stored login credentials;

determining, by the at least one processor and based on the comparing, whether the received login credentials match the pre-stored login credentials;

responsive to determining that the received login credentials match the pre-stored login credentials, determining, by the at least one processor, that the received login credentials are authentic; and responsive to determining that the received login credentials do not match the pre-stored login credentials, determining, by the at least one processor, that the received login credentials are not authentic.

11. The method of claim 10, wherein, after authenticating the user:

enabling, by the at least one processor, functionality associated with the plurality of interactive interface elements; and generating, by the at least one processor, the authentic user interface including the plurality of interactive interface elements having enabled functionality.

12. The method of claim 9, wherein disabling functionality of the plurality of interactive interface elements further includes enabling, by the at least one processor, decoy functionality associated with at least one interactive interface element of the plurality of interactive elements.

13. The method of claim 9, further including:

responsive to determining that the request includes authentic login credentials and is from an unauthorized user:

receiving, by the at least one processor and via the communication interface, user input from the user computing device selecting at least one interactive interface element of the plurality of interactive elements having disabled functionality;

capturing, by the at least one processor, the selection of the at least one interactive interface element; and updating, by the at least one processor, at least one machine learning dataset based on the captured selection.

14. The method of claim 9, wherein the additional information further includes at least one of: an internet protocol (IP) address of the user computing device and global positioning system (GPS) data associated with a location of the user computing device.

15. One or more non-transitory computer-readable media storing instructions that, when executed by a computing platform comprising at least one processor, memory, and a communication interface, cause the computing platform to:

receive a request to access functionality from a user computing device, the request including login credentials of a user;

receive additional information associated with the user computing device, the additional information including data associated with a plurality of different login credentials requesting to access functionality from a same internet protocol address in a predefined time period;

analyze, using one or more machine learning datasets, the request to access functionality and the additional information to determine whether the request includes authentic login credentials and is received from an authorized user or an unauthorized user;

responsive to determining that the request includes authentic login credentials and is from an authorized user:

authenticating the user;

generating an authentic user interface including a plurality of interactive interface elements configured for display in the authentic user interface; and transmitting the authentic user interface to the user computing device;

responsive to determining that the request includes authentic login credentials and is from an unauthorized user:

disabling functionality associated with the plurality of interactive interface elements configured for display in the authentic user interface; and generating a decoy user interface including the plurality of interactive interface elements having disabled functionality and having an appearance similar to the authentic user interface; and transmit the decoy user interface to the user computing device.

16. The one or more non-transitory computer-readable media of claim 15, wherein determining whether the user request includes authentic login credentials further includes:

comparing the received login credentials to pre-stored login credentials;

determining, based on the comparing, whether the received login credentials match the pre-stored login credentials;

responsive to determining that the received login credentials match the pre-stored login credentials, determining that the received login credentials are authentic; and responsive to determining that the received login credentials do not match the pre-stored login credentials, determining that the received login credentials are not authentic.

17. The one or more non-transitory computer-readable media of claim 16, further including instructions that, when executed, cause the computing platform to:

after authenticating the user:

enable functionality associated with the plurality of interactive interface elements; and generate the authentic user interface including the plurality of interactive interface elements having enabled functionality.

18. The one or more non-transitory computer-readable media of claim 15, wherein disabling functionality of the plurality of interactive interface elements further includes enabling decoy functionality associated with at least one interactive interface element of the plurality of interactive elements.

19. The one or more non-transitory computer-readable media of claim 15, further including instructions that, when executed, cause the computing platform to:

responsive to determining that the request includes authentic login credentials and is from an unauthorized user:

receive user input from the user computing device selecting at least one interactive interface element of the plurality of interactive interface elements having disabled functionality;

capture the selection of the at least one interactive interface element; and update at least one machine learning dataset based on the captured selection.

20. The one or more non-transitory computer-readable media of claim 15, wherein the login credentials include at least one of: a username, a password, a personal identification number, and biometric data.

21. The one or more non-transitory computer-readable media of claim 15, wherein the additional information further includes at least one of: an Internet protocol (IP) address of the user computing device and global positioning system (GPS) data associated with a location of the user computing device.

\* \* \* \* \*